United States Patent [19]

Chahroudi

[11] Patent Number: 5,525,430
[45] Date of Patent: Jun. 11, 1996

[54] ELECTRICALLY ACTIVATED THERMOCHROMIC OPTICAL SHUTTERS

[76] Inventor: Day Chahroudi, P.O. Box 497, Placitas, N.M. 87043

[21] Appl. No.: 137,535

[22] Filed: Oct. 18, 1993

Related U.S. Application Data

[63] Continuation of Ser. No. 670,783, Mar. 19, 1991, abandoned, Ser. No. 948,039, Dec. 31, 1986, abandoned, and Ser. No. 441,907, Nov. 28, 1989, abandoned.

[51] Int. Cl.$^6$ ...................................... B32B 9/00
[52] U.S. Cl. ...................... 428/620; 359/289; 359/241; 428/209
[58] Field of Search .................................. 428/203, 620; 359/241, 289

[56] References Cited

U.S. PATENT DOCUMENTS 4,307,942  12/1981  Chahroudi ............................. 359/289
4,832,466  5/1989  Nishimura et al. ..................... 350/354

Primary Examiner—Patrick J. Ryan
Assistant Examiner—Kam F. Lee
Attorney, Agent, or Firm—Willian Brinks Hofer Gilson & Lione

[57] ABSTRACT

An optical shutter which responds to temperature may be caused to respond to an electrical current by placing a transparent conductor of electricity parallel to and in thermal contact with it, and by running an electrical current through the transparent conductor, such that the transparent conductor is resistively heated, and thereby heats the optical shutter. The above transparent conductor may be used simultaneously as a component of a transparent insulation. The electrical current may be controlled by a photosensor, a temperature sensor, a thermostat, and/or a manual switch.

23 Claims, 1 Drawing Sheet

ELECTRICALLY ACTIVATED THERMOCHROMIC OPTICAL SHUTTERS

This is a continuation application of U.S. application Nos. 07/670,783, 06/948,039, and 07/441,907; respectively filed on Mar. 19, 1991, Dec. 31, 1986, and Nov. 28, 1989. These three cases have been abandoned.

BACKGROUND OF THE INVENTION

An electrochromic optical shutter ("EOS") is a thin layered structure which, upon the application of an electrical current or voltage, either momentary or sustained, reversibly changes its transmission of light. A thermochromic optical shutter ("TOS") is a layered structure whose transmission of light changes reversibly in response to temperature. A TOS is made from a layer of thermochromic material, which is a material whose light transmission changes reversibly with temperature.

EOS have been developed for use in glazings where it is desirable to control the transmission of light either for the sake of privacy or to control solar thermal gains or glare. For example, in a conference or bath room with glazings it is desirable to be able to prevent viewing through windows when privacy is required. Using a switch to turn on an EOS is an alternative to drawing curtains. An EOS controlled by a thermostat is an alternative to a TOS to prevent a solar collector from overheating when solar heat is not needed. A skylight whose light transmission is controlled by a light meter or a switch is a way to prevent glare when illumination is not wanted.

The means for varying the amount of sunlight admitted into buildings includes mechanical optical shutters, such as curtains, Venetian blinds, seasonal paint for greenhouses, and skylids. Skylids are automatic mechanical shutters which are actuated thermally by sunlight. Other examples of optical shutters are thin layers of liquid crystals in wrist watches and other displays, electrochromic coatings for automobile rear view mirrors which turn dark electronically, Kerr electro-optic cells for laser modulation, and photochromic glass for eyeglasses.

For many applications, optical shutters should not become highly absorptive of light when they are in their non-transmissive state. For windows and skylights, for example, it is preferred that incident sunlight is reflected rather than absorbed so that it does not become a heat load for the building. Light absorption is a problem with the above mentioned photochromic glass, and for photochromic, electrochromic, and thermochromic coatings, which all turn dark.

EOS have been developed where absorptivity and reflectivity are controlled by an electrical current which drifts an ionic dopant, such as H, Li, or Na, into a semiconductor such as $WO_3$. EOS based on semiconductors have several disadvantages. They do not turn completely opaque, and thus do not offer complete privacy. When switched on, they become dark semi-silvered mirrors through which some view is possible, even though the view is obscured. Because they are partially mirrors, they can reflect an image of the occupants of the room, which is esthetically objectionable. Because they become partially absorptive, they are not completely effective in rejecting unwanted heat from sunlight. Their minimum transmission can be as high as 40%. The best minimum transmission is about 15%. Mass production is problematic because they require at least four layers, all of which must be made with extreme precision by high technology coating methods such as sputtering and coating in atmospheres of less than 1% relative humidity with toxic materials.

Liquid crystal optical shutters are equally complex; they can require two electrode layers, two polarizer layers, two adhesive layers, a polymeric medium, and liquid crystal particles, which degrade in sunlight. Some view is possible through liquid crystal optical shutters in their opaque state. TOS and photochromic optical shutters are activated by heat or light, respectively, and so do not have the advantage of being controlled manually by a switch or automatically by an electronic sensor.

DESCRIPTION OF THE INVENTION AND THE DRAWINGS

The present invention consists of combining a TOS with a transparent conductor of electricity. The present invention offers the following advantages: it is made from non-toxic materials; it has only two layers besides the cover layers; the materials are inexpensive; the materials and layers can be made with existing mass production machinery and processes; it becomes highly reflective (it can transmit only 5% of incident light in its reflective state); it has less than 1% absorption of visible light; it has less than 20% absorption of the entire solar spectrum; it resists degradation by sunlight; and in its reflective state, it may be completely opaque.

The basic idea of the invention is to place a transparent conductor layer in thermal contact with a TOS, and to heat the TOS by running an electrical current through the transparent conductor. In this way, the electrical current heats the transparent conductor resistively, which in turn heats the TOS, which then becomes reflective. In the TOS's invented by the author and others, the shutter turns an opaque white in it's reflective state.

The TOS may consist of a layer of thermochromic material such as a polymer, preferably crosslinked, in aqueous solution. The polymer may be, for example, a random copolymer of: N substituted acrylamides, acrylic acid esters, or olefinic oxides and aldehydes. Typical molecular structures of these polymers are, respectively:

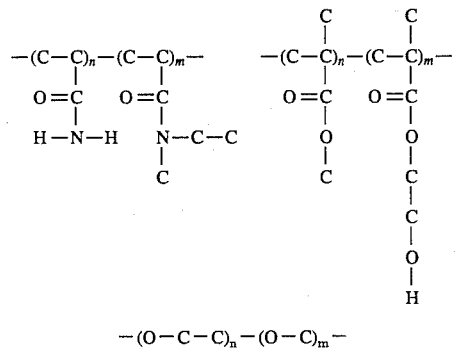

When the polymer/water solution is heated, the polymer precipitates, leaving either fine particles of polymer suspended in water, or fine droplets of water suspended in polymer, or both. The inhomogeneous refractive index causes scattering of light, similarly to white paint. Upon cooling, the water and polymer become mutually soluble again, and the solution turns transparent.

The transparent conductor layer may consist of doped tin or indium oxide layer or of a layer of silver so thin (typically 100–150 angstroms) that it is transparent and which may be antireflected with a high refractive index layer (typically 150–500 angstroms) of dielectric on either side. The conductivity of this transparent conductor may be in the range of 1 to 100 ohms per square.

The class of transparent conductors includes low emissivity coatings which are currently mass produced all over the world. Transparent Conductive $SnO_2$ coated glass is available, for example, from Libby Owens Ford under the trade name of TEC70-3. It is coated with $SiO_2$ for antireflection purposes. It is pyrolytically coated onto the glass as it comes off the production line, hot. Conductive silver coatings on plastic film, antireflected with $In_xSn_yO_z$, called Heat Mirror, is available from Southwall Technologies. Similar silver coatings on glass, antireflected with $ZnO_2$, $CdSnO_4$, $SnO_2$, $Bi_2O_3$, $TiO_2$, etc., are also mass produced. Conductivities vary from about 50 to 1 ohms per square, and costs vary from $0.05 to $0.50 per square foot.

FIG. 1 shows a cross section of a typical edge detail of the invention. 1 is a glass or transparent plastic sheet or film. 2 is an electrically conductive adhesive, typically epoxy loaded with silver particles or flakes. 3 is an electrically conductive wire such as copper which also serves as a spacer between 1 and 4. 4 is a glass or transparent plastic sheet or film. 5 is a transparent conductive coating. 6 is a layer of thermochromic material. Thus, a means for passing electrical current through said transparent conductor includes the electrically conductive wire and the electrically conductive adhesive.

Figure 1:
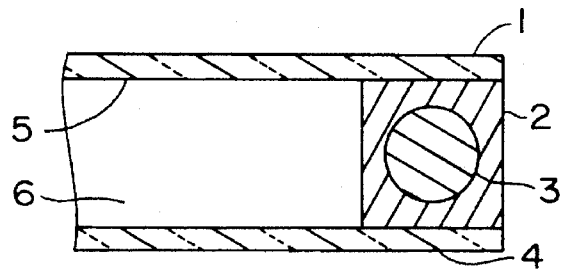

It is necessary, when the photochromic material 6 contains a volatile material such as water, to completely seal all of the edges of the glass or transparent plastic layers 1 and 4. Examples of seals are, in FIGS. 1 and 3, formed by the combination of the adhesive 2 with the wire 3. Another example of a seal is shown in FIGS. 2, 3, and 4, where the seal is formed by the combination of the adhesive layers 7 and the spacer 8. Conductive and non-conductive seal designs other than those shown in FIGS. 1, 2, 3 and 4 may be used.

The electrochromic shutter operates as follows: a voltage, ac or dc, is put across the copper wires 3 and 3; the conductive epoxy 2 transmits this voltage to the transparent conductor 5; the resulting current heats up the transparent conductor 5; this heat causes the layer of thermochromic material 6 to become opaque; the thermochromic material 6 is made transparent by removing the voltage between wires 3 and 3, so that the thermochromic material cools to ambient temperature. The switching temperature of the thermochromic material must be above ambient temperature.

The invention further includes a means for controlling the electrical current. Examples of such means are described below. In FIGS. 3 and 4, 9 is a temperature sensor or thermostat which controls the current between wires 3 and 3 and thereby through the transparent conductor. 11 is electrical wires to temperature sensor or thermostat 9. A manually operated electrical switch (not shown) such as the type used to turn light bulbs on or off may be used either instead of, or in series with, the temperature sensor or thermostat 9. A temperature sensor or thermostat 9 in or in thermal contact with the layer of thermochromic material 6 may be used to regulate the applied voltage and thereby reduce electrical power consumption. An electrical switch controlled by a light meter may also be used.

Figure 2:
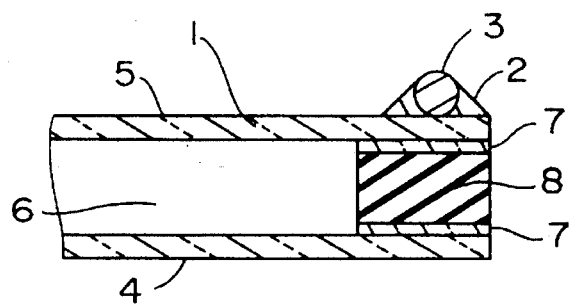
FIG. 2 shows a cross section of an alternate edge detail. The numbers in FIG. 2 refer to the same materials as in FIG. 1, except that 7 is an adhesive, such as epoxy, and 8 is a spacer such as rubber or plastic.
Figure 3:
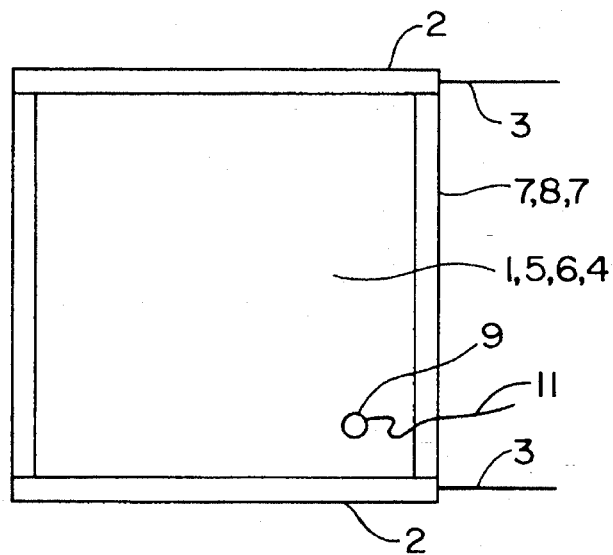
FIG. 3 shows a top view of FIGS. 1, 2, and 4. The numbers refer to the same items as in FIGS. 1, 2, and 4.
Figure 4:
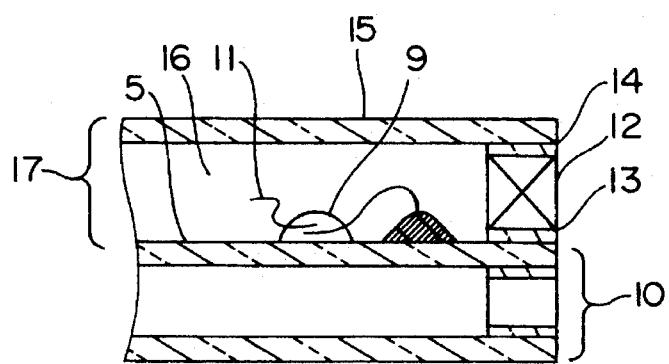

FIG. 4 shows an EOS integrated with a transparent insulation such as a low emissivity sealed window. 10 is an EOS, for example the one shown in FIGS. 1 or 2. 9 may be a thermostat or temperature sensor which responds to the temperature of the thermochromic material component of the EOS. 11 is a lead, as shown in FIGS. 3 and 4, to the electrical power source (not shown) or to an on/off switch (not shown) connected to the electrical power source (not shown). 12 is a spacer to create a gas gap between the glass or transparent plastic glazing 15 and the EOS 10. If 12 is electrically conductive, metal for example, then 13 is an adhesive layer which electrically insulates the conductive coating 5 from the spacer 12. If the spacer 12 is nonconductive, plastic for example, then 13 need not be an insulator. 14 is an adhesive between spacer 12 and glazing 15. 16 is a gas which prevents the flow of heat between 10 and 15. 17 is a transparent insulation. The example of a transparent insulation shown in FIG. 4 is the combination of the low emissivity coating 5 (which is the same as a transparent conductive coating with an electrical resistance of less than 5 ohms per square) with the gas layer 16 contained between glazings 10 and 15. However, other transparent insulations may be used.

In FIG. 4, the conductive low-e coating serves both as a heating element for the layer of thermochromic material 6, thereby making it an EOS 10, and also as a component in the transparent insulation 17. Electrical power to the EOS may be controlled by an on/off switch (not shown) alone or in series with either a thermostat 9, such as a bimetallic strip, or a temperature sensor 9 which is mounted in thermal contact with the EOS 10 and a controller (not shown). The on/off switch may be used to activate the thermostat or temperature sensor's control of the EOS 10.

A wide range of changes and modifications can be made to all of the embodiments described above. It is therefore intended that the foregoing detailed description be understood as not limiting the invention, and that it is the following claims, including all equivalents, which are intended to define the scope of this invention.

REFERENCES

Optical shutters are surveyed in *Electrochromic and Thermochromic Materials for Solar Energy Applications* USDOE Report LBL-18299, and in *Large Area Chromogenics*, edited by C. M. Lampert, SPIE Optical Engineering Press (1988); *Optical Materials Technology for Energy Efficiency and Solar Energy Conversion*, edited by C. G. Granqvist, Vol. 9 (1990), Vol. 8 (1989), Vol. 7 (1988); *Material & Optics for Solar Energy Conversion and Advanced Lighting Technology*, edited by C. M. Lampert, SPIE Optical Engineering Press (1986). Mechanical optical shutters for buildings are surveyed in *Thermal Shutters and Shades* by W. A. Shurcliff, Brick House, Andover, Mass.

TOS are described in U.S. Pat. Nos. 3,953,110; 4,085,999; 4,307,942 and applications 1986, 06/948,039 and 1989, 07/441,907 by the author and in U.S. Pat. Nos. 4,137,769; 4,358,476; 4,444,846; 4,832,466; 4,900,135; 5,007,714 by others. Transparent conductors are described in U.S. Pat. Nos. 4,204,942; 4,298,444; 5,198,922 by the author.

Transparent insulations are discussed in: *Transparent Insulation Materials* and *Transparent Insulation T2*, both edited by L. F. Jesch, Franklin Co. Consultants Ltd. for the German Solar Energy Society, 1986 and 1988, respectively; honeycomb structures are discussed in *Transparent Insulation Materials*, by Volker Wittwer, in *Optical Materials*

*Technology*, p. 284, March 1990, International Society For Optical Engineering; vacuum transparent insulations are discussed in *Evaluation of a Thermally Insulating Vacuum Window*, by J. D. Garrison, 15th National Passive Solar Conference, p. 43, American Solar Energy Society, March 1990; and aerogel transparent insulations are discussed in *Aerogels—a new class of material*, by M. Mielke et al., presented at The 1st International Workshop on Transparent Insulation Materials for Passive Solar Energy Utilization, p. 25, Nov. 27–28, 1986, German section of International Solar Energy Society. Transparent insulations utilizing convection baffles which are transparent to light and thermal radiation are claimed in U.S. patent application 1991, 07/670,783 by the author.

I claim:

1. A layered structure forming an electrochromic optical shutter used for architectural glazings comprising a layer of thermochromic material disposed parallel to and in thermal contact with a layer of transparent conductor of electricity and an electrical conductor for passing electrical current through said transparent conductor such that heat generated by said current causes said thermochromic material to increase in temperature and thereby become less transmissive of light and such that cessation of said current causes said thermochromic material to decrease in temperature and thereby become more transmissive of light, the layered structure being transmissive to light when electrical current is not applied to the transparent conductor of electricity.

2. A layered structure as in claim 1, further comprising a layer of glass disposed on both sides of said layer of thermochromic material and with said layer of transparent conductor of electricity disposed on one of the surfaces of one of said layers of glass.

3. A layered structure as in claim 2, further comprising a seal in between and on all the edges of said layers of glass.

4. A layered structure as in claim 1, further comprising a layer of transparent plastic disposed on both sides of said layer of thermochromic material and with said layer of transparent conductor of electricity disposed on one of the surfaces of one of said layers of transparent plastic.

5. A layered structure as in claim 4, further comprising a seal in between and on all the edges of said layers of transparent plastic.

6. A layered structure as in claim 1, wherein said electrical conductor comprises: two opaque conductors of electricity disposed on two opposing edges of said layer of transparent conductor.

7. A layered structure as in claim 6, where said opaque conductors of electricity are mechanically fastened to and maintained in electrical contact with said layer of transparent conductor by an electrically conductive adhesive.

8. A layered structure as in claim 7, where said electrically conductive adhesive is epoxy filled with silver particles.

9. A layered structure as in claim 1, further comprising an electrical switch for controlling said electrical current.

10. A layered structure as in claim 9, where said electrical switch is manually operated.

11. A layered structure as in claim 9, where said electrical switch is controlled by a thermostat.

12. A layered structure as in claim 11, where said thermostat is in thermal contact with said layer of thermochromic material.

13. A layered structure as in claim 12, where said thermostat is set to turn off said current at a temperature up to twenty degrees centigrade above the temperature at which said thermochromic material becomes opaque.

14. A layered structure as in claim 9, where said electrical switch is controlled by a light meter.

15. A layered structure as in claim 1, where said transparent conductor of electricity is selected from the group consisting of: semiconductors which are doped oxides of tin and indium and the metals silver, copper and aluminum with optional antireflection layers on one and on both sides of said semiconductor and metal.

16. A layered structure as in claim 1, where said thermochromic material is a polymer and solvent which are soluble below a preselected temperature between 0° and 100° C. and precipitate from solution above said preselected temperature.

17. A layered structure as in claim 15, where said solvent is water and said polymer is selected from the groups comprising: copolymers of acrylamide and N substituted acrylamides, copolymers of acrylic and methacrylic esters, and copolymers of olefinic oxides and aldehydes.

18. A light admitting structure comprising an electrochromic shutter as in claim 1 and a transparent insulation.

19. A light admitting structure as in claim 18, where said transparent insulation is selected from the group comprises: transparent low emissivity coatings, convection baffles which are transparent to light and thermal radiation, a layer Of gas, a layer of vacuum, honeycombs with the axis of their cells disposed approximately perpendicular to said layers, and an aerogel.

20. A layered structure as in claim 1, wherein the layer of the transparent conductor of electricity has the shape of a sheet.

21. A layered structure as in claim 1, wherein the layer of the transparent conductor of electricity has the shape of a sheet substantially corresponding to the shape and size of the thermochromic material, which also has the shape of a sheet.

22. A layered light admitting structure comprising an electrochromic shutter as in claim 1 with a transparent insulation disposed on both sides of said shutter.

23. A layered light admitting structure as in claim 22, where said transparent insulation is selected from the group consisting of: transparent low emissivity coatings, convection baffles which are transparent to light and thermal radiation, a layer of gas, a layer of vacuum, honeycombs with the axis of their cells disposed approximately perpendicular to said layers, and an aerogel.

* * * * *